United States Patent
Zhang et al.

(10) Patent No.: US 8,619,199 B1
(45) Date of Patent: Dec. 31, 2013

(54) METHOD AND APPARATUS FOR PERFORMING AUTOMATIC GAIN CONTROL TO TRACK SIGNAL VARIATIONS IN A WIRELESS COMMUNICATION SIGNAL

(75) Inventors: Jin Zhang, Newark, CA (US); Xiaolin Che, Shanghai (CN); Kok-Wui Cheong, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 16 days.

(21) Appl. No.: 13/425,914

(22) Filed: Mar. 21, 2012

Related U.S. Application Data

(60) Provisional application No. 61/467,326, filed on Mar. 24, 2011, provisional application No. 61/546,362, filed on Oct. 12, 2011.

(51) Int. Cl.
*H04N 5/445* (2011.01)

(52) U.S. Cl.
USPC ...................... 348/726; 455/234.1; 455/234.2

(58) Field of Classification Search
USPC .................. 348/731–733, 555, 725, 726; 455/232.1, 234.1, 234.2, 239.1, 240.1, 455/241.1

See application file for complete search history.

(56) References Cited

U.S. PATENT DOCUMENTS

| 6,459,458 B1 * | 10/2002 | Balaban | 348/678 |
| 2007/0229707 A1 * | 10/2007 | Rumreich | 348/573 |

* cited by examiner

*Primary Examiner* — Michael Lee

(57) ABSTRACT

A demodulator includes an analog to digital converter configured to receive a television signal from a tuner and output a corresponding digitized television signal, where the television signal comprises a digital television signal or an analog television signal. A first gain module is configured to generate, based on the digitized television signal, a first feedback for adjusting the television signal provided to the analog to digital converter by the tuner, where the first feedback is applied to the television signal regardless of whether the television signal is a digital television signal or an analog television signal. A second gain module is configured to generate second feedback for further adjusting the television signal provided to the analog to digital converter by the tuner, where the second feedback is provided to further adjust the television signal only when the television signal is an analog television signal.

38 Claims, 11 Drawing Sheets

METHOD AND APPARATUS FOR PERFORMING AUTOMATIC GAIN CONTROL TO TRACK SIGNAL VARIATIONS IN A WIRELESS COMMUNICATION SIGNAL

CROSS-REFERENCE TO RELATED APPLICATIONS

The present disclosure claims priority from U.S. Provisional Patent Application No. 61/467,326, filed on Mar. 24, 2011, and U.S. Provisional Patent Application No. 61/546,362, filed on Oct. 12, 2011, both of which are incorporated herein by reference in their entirety.

FIELD

The technology described in this disclosure relates generally to techniques for processing wireless communication signals, and more particularly to techniques for performing automatic gain control to track signal variations in a wireless communication signal—e.g., a television signal.

BACKGROUND

Analog television signals, such as National Television System Committee (NTSC) signals and Phase Alternating Line (PAL) signals, tend to be susceptible to certain interferences that do not similarly affect digital television signals. For example, analog television signals may be susceptible to fast amplitude variations that may be caused, for example, by instability of transmitters, power supply modulation, or Doppler effects caused, e.g., by an airplane. Such variations may result in undesirable visual effects. Signal magnitude variations may need to be continuously and precisely compensated for in analog television signals because video quality is highly sensitive to such changes in magnitude.

SUMMARY

In accordance with the teachings provided herein, systems and methods are provided for a demodulator that includes an analog to digital converter configured to receive a television signal from a tuner and output a corresponding digitized television signal, where the television signal comprises a digital television signal or an analog television signal. A first gain module is configured to generate, based on the digitized television signal, a first feedback for adjusting the television signal provided to the analog to digital converter by the tuner, where the first feedback is applied to the television signal regardless of whether the television signal is a digital television signal or an analog television signal. A second gain module is configured to generate second feedback for further adjusting the television signal provided to the analog to digital converter by the tuner, where the second feedback is provided to further adjust the television signal only when the television signal is an analog television signal.

As an additional example, in a method of demodulating a television signal, an analog to digital conversion is performed on a television signal received from a tuner to generate a digitized television signal, where the television signal received from the tuner comprises a digital television signal or an analog television signal. First feedback is generated for adjusting the digitized television signal, where the first feedback is applied to the television signal regardless of whether the television signal is a digital television signal or an analog television signal. Second feedback is generated for further adjusting the digitized television signal, where the second feedback is provided to further adjust the television signal only when the television signal is an analog television signal.

As a further example, in a system for demodulating a television signal, an integrated circuit includes circuitry for performing a method. In the method, an analog to digital conversion is performed on a television signal received from a tuner to generate a digitized television signal, where the television signal received from the tuner comprises a digital television signal or an analog television signal. First feedback is generated for adjusting the digitized television signal, where the first feedback is applied to the television signal regardless of whether the television signal is a digital television signal or an analog television signal. Second feedback is generated for further adjusting the digitized television signal, where the second feedback is provided to further adjust the television signal only when the television signal is an analog television signal.

DETAILED DESCRIPTION

Figure 1:
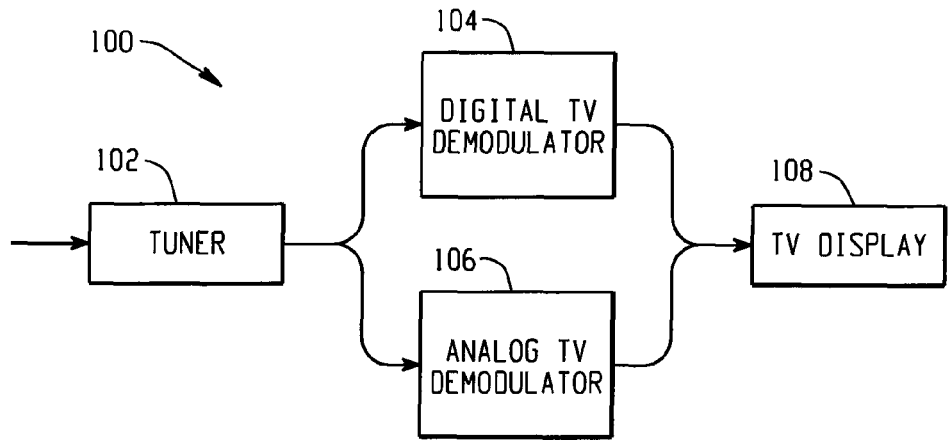
FIG. 1 is a block diagram depicting a digital television receiver having separate digital and analog television demodulators.

Different demodulation processing techniques are generally required to convert each of digital television signals and analog television signals to viewable video on a display. While digital television signals are typically thought of as providing higher quality, more desirable video, significant amounts of content are still provided via analog television signals. Thus, it is desirable to provide a television receiver that can produce video from both analog television signals and digital television signals. Traditionally, the different processing requirements for analog television signals and digital television signals have been addressed through utilization of separate demodulators—e.g., a digital television demodulator to demodulate digital television signals, and an analog television demodulator to demodulate analog television signals. FIG. 1 is a block diagram depicting a digital television receiver 100 including a tuner 102, a digital television demodulator 104, and an analog television demodulator 106 separate from the digital television demodulator 104. As shown in FIG. 1, analog television signals and digital television signals are received by the tuner 102 and respectively transmitted to the digital television signal demodulator 104 and the analog television signal demodulator 106. When a digital television signal is received, the digital television signal demodulator 104 processes the signal and transmits a digitized version of the signal to a television display 108 for viewing. When an analog television signal is received, the analog television signal demodulator 106 processes the signal and transmits a digitized version of the signal to a television display 108 for viewing.

Figure 2:
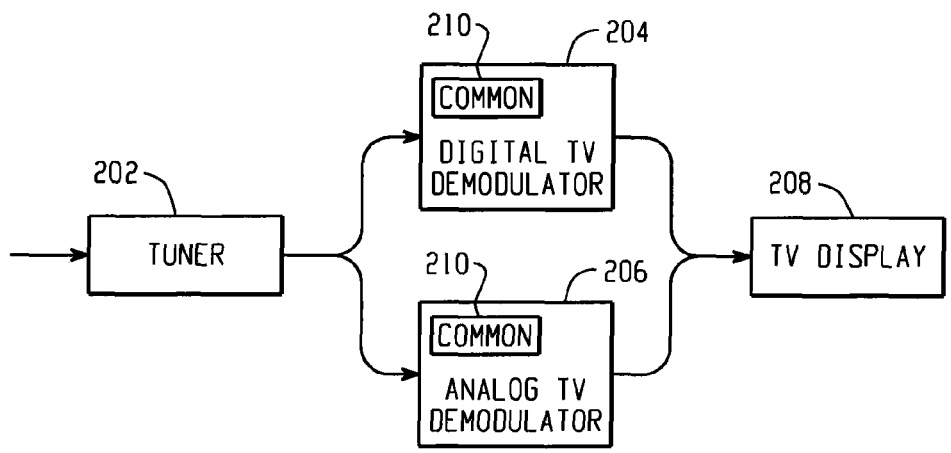
FIG. 2 is a block diagram depicting common functionality between a digital television signal demodulator and an analog television signal demodulator.

While functional, the separate demodulator implementation of FIG. 1 may be suboptimal because the two demodulators may include certain duplicative functionality. FIG. 2 is a block diagram depicting common functionality between a digital television signal demodulator 204 and an analog television signal demodulator 206. An analog television signal or a digital television signal is received by a tuner 202 that transmits the television signal for a desired channel to the appropriate digital television signal demodulator 204 or analog television signal demodulator 206. The signal demodulators 204, 206 process the television signal and transmit output to a television display 208 for viewing. Certain functionality 210 is common between the digital television signal demodulator 204 and the analog television signal demodulator 206. For example, both of the signal demodulators 204, 206 may provide common functions that include automatic gain control, down-conversion, and band filtering. By implementing separate signal demodulators 204, 206, hardware associated with the common functions may be duplicated, adding unwanted cost to digital television receivers that support both analog television signals and digital television signals.

Figure 3:
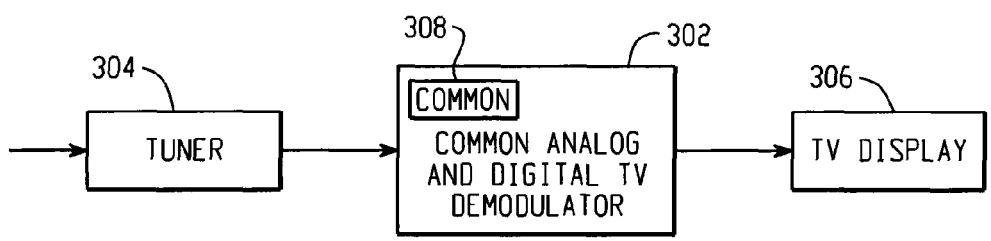
FIG. 3 is a block diagram depicting a common analog/digital television signal demodulator.

To minimize the added costs resulting from the duplicative hardware described above, a digital television signal demodulator and an analog television signal demodulator can be combined, such as on a single integrated circuit chip. FIG. 3 is a block diagram depicting a digital television receiver 300 including a tuner 304 and a common analog/digital television signal demodulator 302. The common analog/digital television signal demodulator 302 receives a television signal from the tuner 304. The common analog/digital television signal demodulator 302 processes the received television signal and transmits an output to a television display 306 for viewing. The common analog/digital signal demodulator 302 includes certain common hardware 308 for providing functionalities common to both analog television signal demodulation and digital television signal demodulation. The common hardware 308 is only included in one instance in the common analog/digital television signal demodulator 302, offering a potential cost savings over the separate demodulator implementations of FIGS. 1 and 2.

Figure 4A:
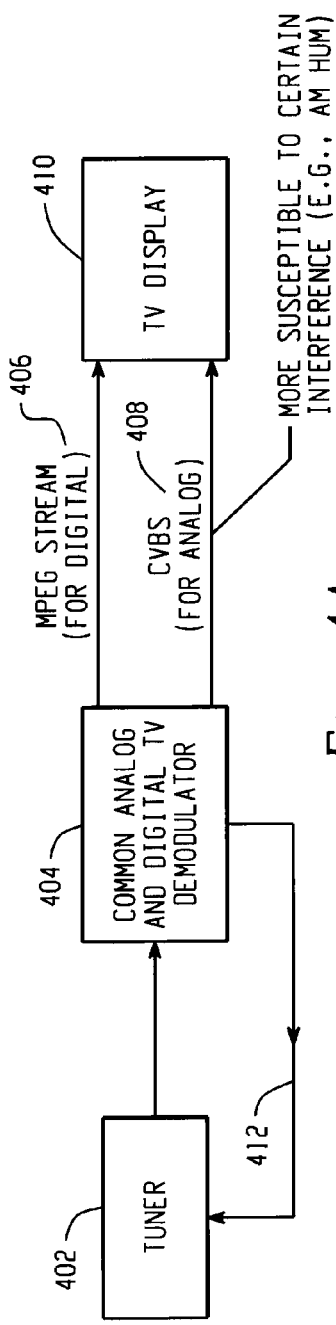
FIG. 4A is a block diagram depicting processing outputs of a common signal demodulator.

FIG. 4A is a block diagram depicting processing outputs of a common analog/digital television signal demodulator 404 (also referred to herein as a "common demodulator 404"). A tuner 402 receives analog television signals or digital television signals and transmits the analog television signals or the digital television signals to the common demodulator 404 for processing. For digital television signals, the common demodulator 404 outputs a digital television output 406, such as a Moving Picture Experts Group (MPEG) stream. For analog television signals, the common demodulator 404 outputs an analog television output 408, such as a composite video, blanking, and sync (CVBS) signal. The outputs 406, 408 are transmitted to a television display 410 for viewing.

The common demodulator 404 is able to take advantage of certain hardware for operations on both analog television signals and digital television signals—such certain hardware which is implemented to perform processing on both analog television signals and digital television signals is referred to herein as "common hardware." For example, common hardware may be used to provide down-conversion and band filtering for both analog television signals and digital television signals. At least some portion of automatic gain control may also be provided by the common hardware. However, because of analog television signals' increased susceptibility to certain interferences (e.g., amplitude modulation (AM) hum), the level of automatic gain control needed for digital television signals may not be sufficient for quality analog television signal demodulation. Thus, while some level of automatic gain control for analog television signals may be provided by common hardware, certain additional processing may be provided to the analog television signals to improve video quality. Automatic gain control is affected by the common demodulator 404 via feedback 412 to the tuner 402.

Figure 4B:
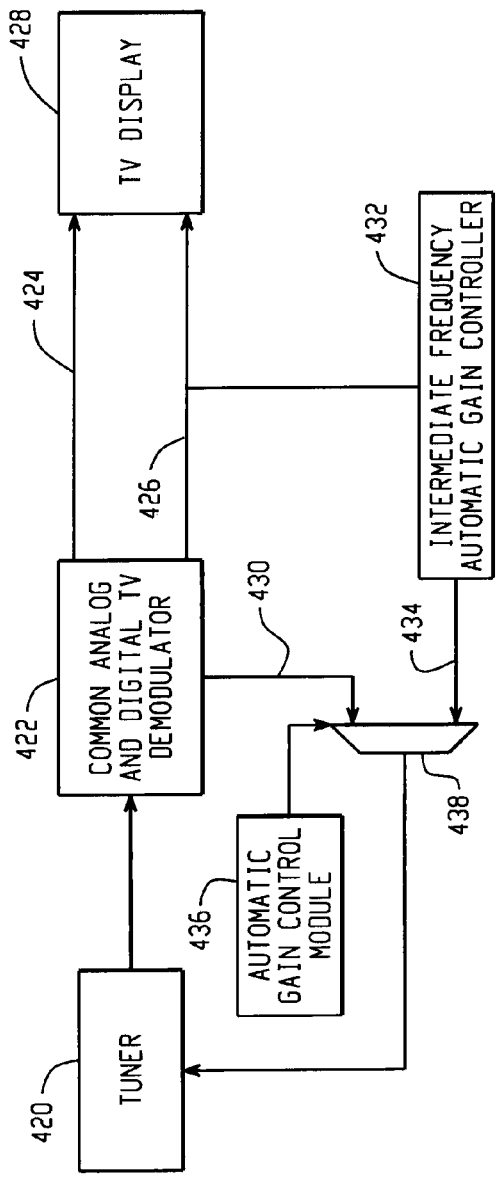
FIG. 4B is a block diagram depicting additional automatic gain control processing.

FIG. 4B is a block diagram depicting additional automatic gain control processing. A tuner 420 receives analog or digital television signals and transmits the analog television signals or digital television signals to a common analog and digital television demodulator 422. The common analog and digital television demodulator 422 transmits a digital television output 424 or an analog television output 426 to the television display 428 for viewing. The common analog and digital television demodulator 422 also transmits an automatic gain control signal 430 to the tuner 420. Additional automatic gain control processing is performed by an intermediate frequency automatic gain controller 432, which may be configured to provide a fine tuning gain control signal 434 to the tuner 420. An automatic gain control module 436 controls a multiplexer 438 for selecting which of the two automatic gain control signals 430, 434 to transmit to the tuner 420. The automatic gain control module 436 determines its selection based on one or more switching conditions.

Figure 5:
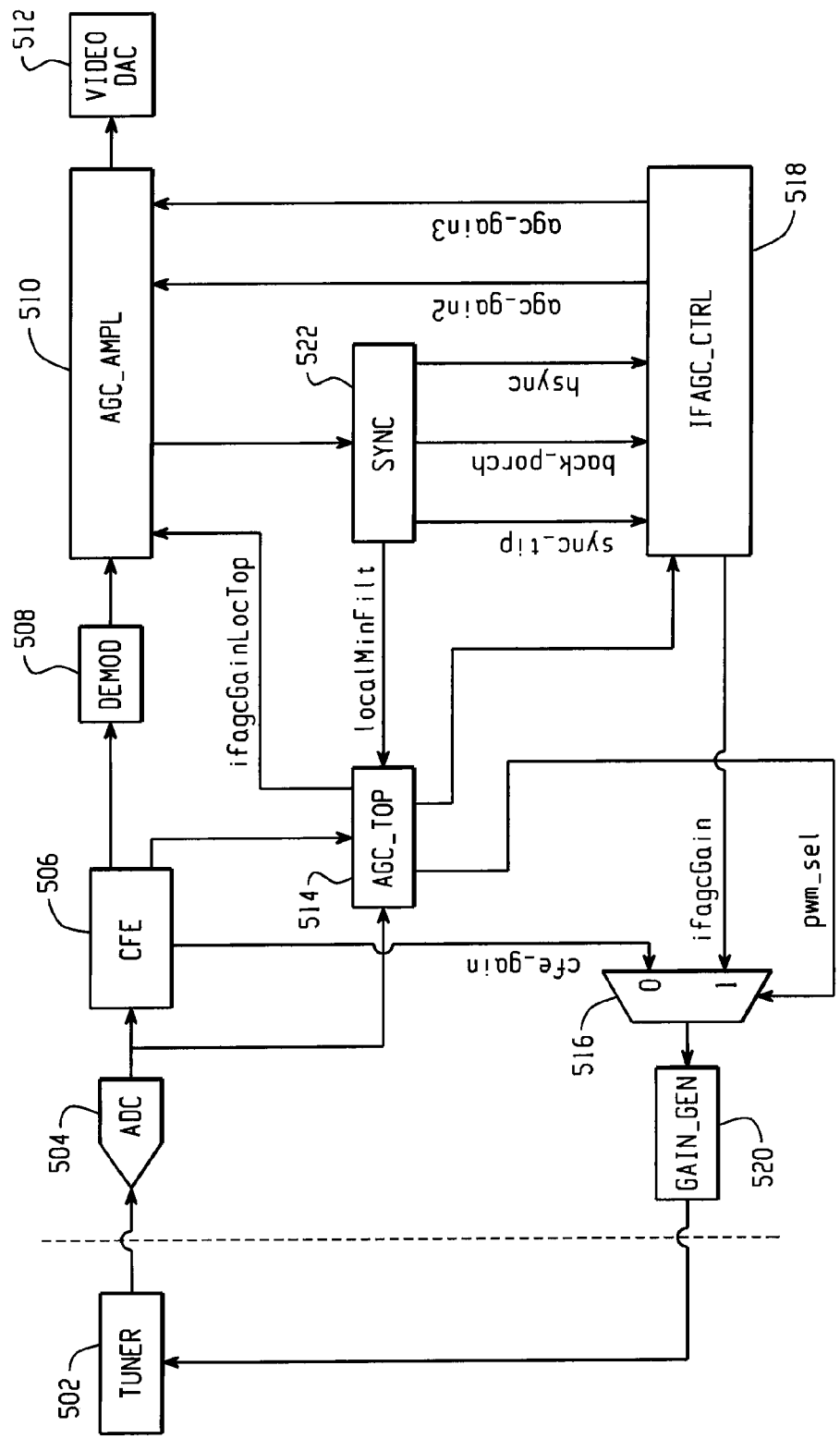
FIG. 5 is a block diagram depicting a digital television receiver having common analog television signal and digital television signal processing hardware.

FIG. 5 is a block diagram depicting a digital television receiver having common analog television signal and digital television signal processing hardware. A tuner 502, which may be provided as a separate component from the digital television receiver, selects one channel from a spectrum of channels and transmits an associated analog or digital television signal to an analog to digital converter (ADC) 504. The analog or digital television signal is processed by the analog to digital converter 504 to output a corresponding digitized television signal. The digitized television signal is transmitted to a common front end 506 that is configured to perform certain operations on the digitized signal, regardless of whether the digitized signal is associated with an analog television signal or a digital television signal. After the common front end 506 completes processing of the digitized television signal, the signal is transmitted to a demodulator 508 that implements signal type specific processing (i.e., analog television signal or digital television signal). The demodulated signals are transmitted to an automatic gain control amplifier 510, and the amplified signal is transmitted to a video digital to analog converter (DAC) 512 and display for viewing.

The common front end 506 can include certain common functions, such as down-conversion, band filtering, and initial automatic gain control. However, it may be desirable to incorporate additional automatic gain control functionality, especially for processing of analog television signals. For example, the output of the common front end 506 may vary by about 2-3 dB in magnitude for both analog television signals and digital television signals. While this variation has little effect on the video quality for digital television signals, that variation can cause significant video quality issues, such as undesirable flickering, flashings, loss of synchronization, or other uncomfortable visual effects.

Thus, the digital television receiver of FIG. 5 includes an automatic gain control module 514 for controlling additional automatic gain control processing. The automatic gain control module 514 directs a multiplexer 516 to transmit automatic gain control feedback to the tuner 502 from either i) the common front end 506 automatic gain control portion or ii) an intermediate frequency automatic gain controller (IFAGC) 518 used for analog television signal operations. When digital television signals are being received, the automatic gain control module 514 directs the common front end 506 automatic gain control signal be transmitted to a tuner gain generator 520 and subsequently to the tuner 502 as feedback for adjusting the signal transmitted to the analog to digital converter 504. One embodiment of a tuner gain generator 520 includes a pulse width modulator generator. Other embodiments of the tuner gain generator 520 can include a sigma-delta digital to analog converter or digital interfaces. When analog television signals are being received, the automatic gain control module 514 selects one of the common front end 506 automatic gain control signal or the intermediate frequency automatic gain controller's 518 signal as feedback to the tuner 502 based on one or more conditions. The digital television receiver of FIG. 5 also includes a synchronization module 522 that is responsive to the automatic gain control amplifier 510 for providing synchronization controls to the automatic gain control module 514 and the intermediate frequency automatic gain controller 518.

In some implementations, the common front end 506 automatic gain control may be used to provide coarse grained, step control feedback to the tuner 502, while the intermediate frequency automatic gain control 518 may be utilized to provide fine grained control. For example, the common front end 506 gain may be set to utilize the central 70% of the range of the analog to digital converter 504 (the analog to digital converter has a resolution and a range, wherein the resolution is associated with a number of different digital values that can be represented by the digitized television signal, and wherein the range is associated with a range of values that can be represented by the number of different digital values). Because digital television signals are less susceptible to intermediate frequency interference, the automatic gain control 506 coarse grained feedback may be sufficient for providing a quality video output for digital television signals.

The coarse grained feedback of the common front end 506 may also be sufficient for initial and recovery control for analog television signal processing. In such an implementation, the common front end may be the default automatic gain control on start-up and other times when automatic gain control is unstable. However, the common front end's 506 automatic gain control may be insufficient for handling fast signal variations. Once a threshold degree of automatic gain control stability and accuracy is achieved, as measured by the automatic gain control module 514, automatic gain control feedback may be transitioned to the intermediate frequency automatic gain control 518 for fine grained adjustment of the tuner signal to further track the fast signal variations and eliminate unwanted analog television signal video effects. Should stability or accuracy of automatic gain control be lost, such as via saturation of the analog to digital converter 504, adjacent channel interference (ACI), or otherwise, the common front end 506 coarse grained feedback may again be utilized. A synchronization module 522 may provide processing to achieve synchronization of the signal received from the demodulator 508 and supply certain signals necessary for the intermediate frequency automatic gain control 518.

Figure 6:
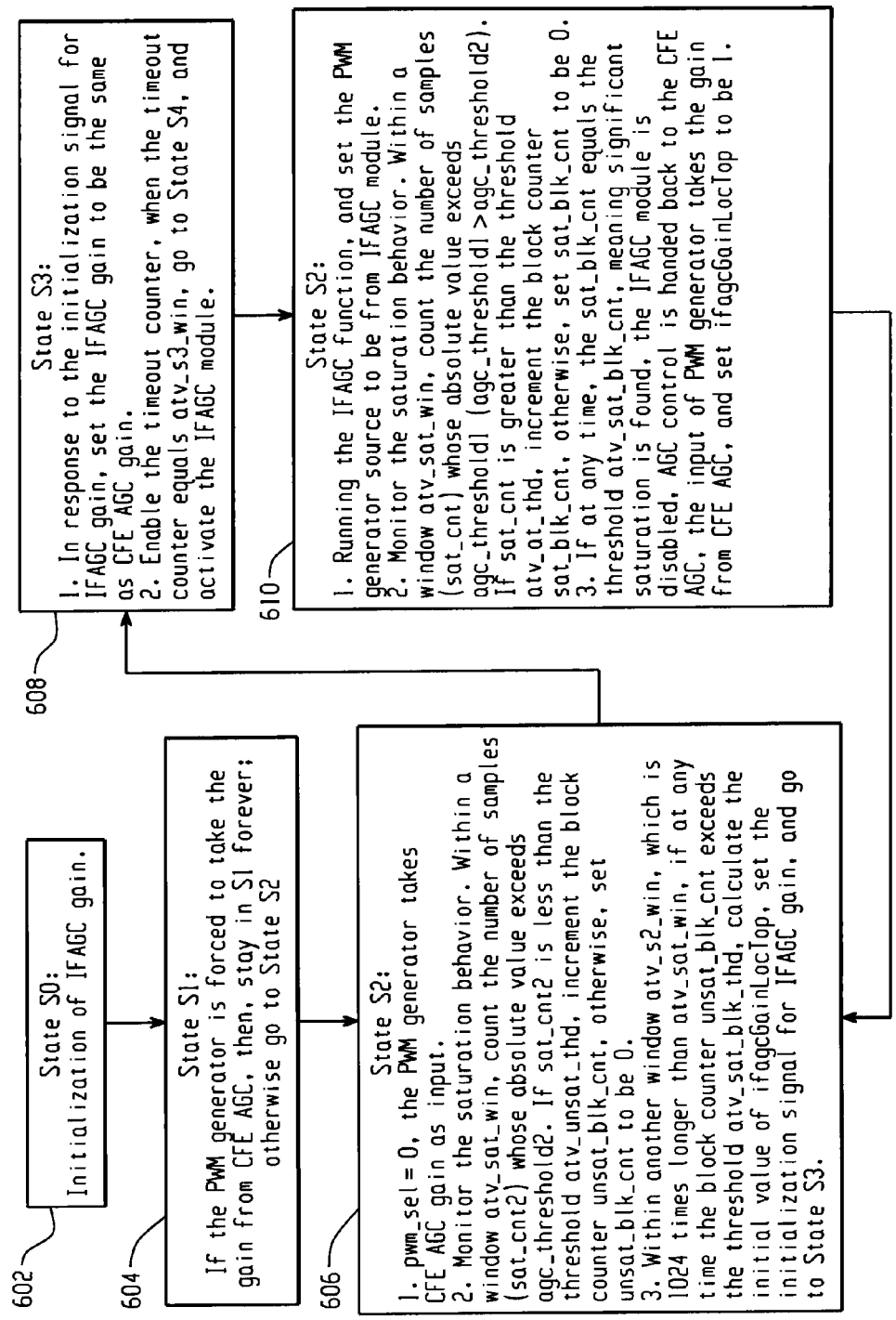
FIG. 6 is a diagram depicting a finite state machine that may be implemented by an automatic gain control module for transitioning between common front end and intermediate frequency automatic gain control.

FIG. 6 is a diagram depicting a finite state machine that may be implemented by an automatic gain control module for transitioning between common front end and intermediate frequency automatic gain control. The finite state machine initializes at 602 and proceeds to 604. If the finite state machine is instructed to only use the common front end automatic gain control, such as when digital television signals are being processed, then the finite state machine remains at 604. Otherwise the finite state machine progresses to state S2 at 606.

In state S2, the automatic gain control module selects the automatic gain control signal from the common front end for transmission to the tuner. Additionally, the automatic gain control module monitors the saturation behavior of the output of the analog to digital converter. If the analog to digital converter output does not exhibit signs of saturation, then the automatic gain control module may transition automatic gain control to the intermediate frequency automatic gain control. For example, the analog to digital converter output may be monitored within consecutive windows, whose length is given by atv_sat_win. In each window, if the analog to digital converter output signal exceeds the threshold agc_threshold2, the counter, sat_cnt2, is incremented by 1. At the end of each window, if the number of saturations identified by the counter is less than a threshold amount, atv_unsat_thd, the window is considered not saturated, and a block counter, unsat_blk_cnt, is incremented by 1. After staying at S2 for a certain amount of time, as indicated by atv_s2_1, which may be 1024 times the length of a window, if the counter, unsat_blk_cnt, exceeds the threshold, atv_sat_blk_thd, then the intermediate frequency signal is considered to be settled on an appropriate value such that there is no significant saturation for the analog to digital converter output. The state machine then transitions to state S3 at 608.

State S3 operates as a transition state between transmission of the common front end automatic gain control feedback signal and the intermediate frequency automatic gain control feedback signal. A smooth transition may be important to avoid unwanted video artifacts from being produced during the transition. Upon transition to state S3, an InitIFAGCGain signal is set to 1, signaling that the intermediate frequency automatic gain control feedback signal should be output at the same level as the current common front end automatic gain control feedback signal and transmitted to the tuner gain generator. The intermediate frequency automatic gain control may then adjust its feedback output from the synchronized level to provide a smooth transition. Additional processing may be performed in generating the intermediate frequency automatic gain control feedback signal so that synchronization is maintained. For example, the scalar ifagcGainLocTop signal may be generated according to:

$$ifagc\text{GainLocTop} = (atv\_ifagc\_v\text{ref/localMin}Filt),$$

where atv_ifagc_vref is the reference level of a sync tip portion of a demodulated television signal and the localMinFilt variable is generated from the synchronization module as the smoothed measurement of the actual sync tip level of the intermediate frequency level. In many cases, the actual sync tip level is close to the reference level, and ifagcGainLocTop is near 1. If strong adjacent channel interference is present and sampled by the analog to digital converter, the ifagcGainLocTop may be set to a value greater than 1 to compensate for a loss of ADC dynamic range. The automatic gain control module remains at state S3 for a predetermined time period atv_s3_win before transitioning to state S4 at 610.

State S4 directs transmission of the intermediate frequency automatic gain control feedback signal to the tuner via the tuner gain generator and monitors the saturation behavior of the analog to digital converter in a similar manner as state S2. In some implementations, the saturation threshold for the analog to digital converter may be set higher than in state S2. If significant saturation is detected and the condition sat_blk_cnt=atv_sat_blk_thd is met, the automatic gain control module reverts to state S2, and gain control is handed back to the common front end. The common front end automatic gain control feedback signal may be initially forced to the last intermediate frequency automatic gain control feedback signal to ensure a smooth transition.

Figure 7:
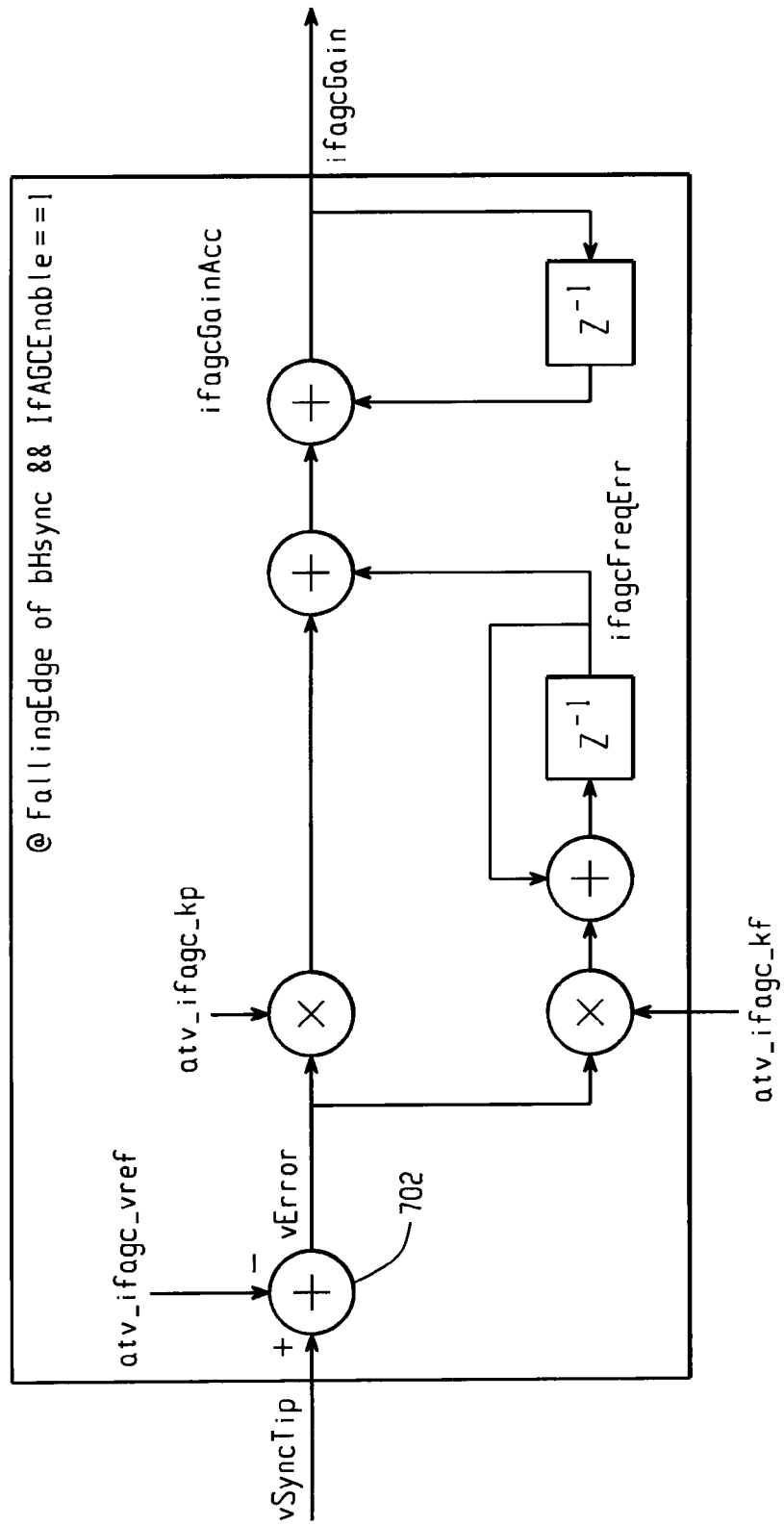
FIG. 7 is a block diagram depicting an example control loop of the intermediate frequency automatic gain controller.
Figure 8:
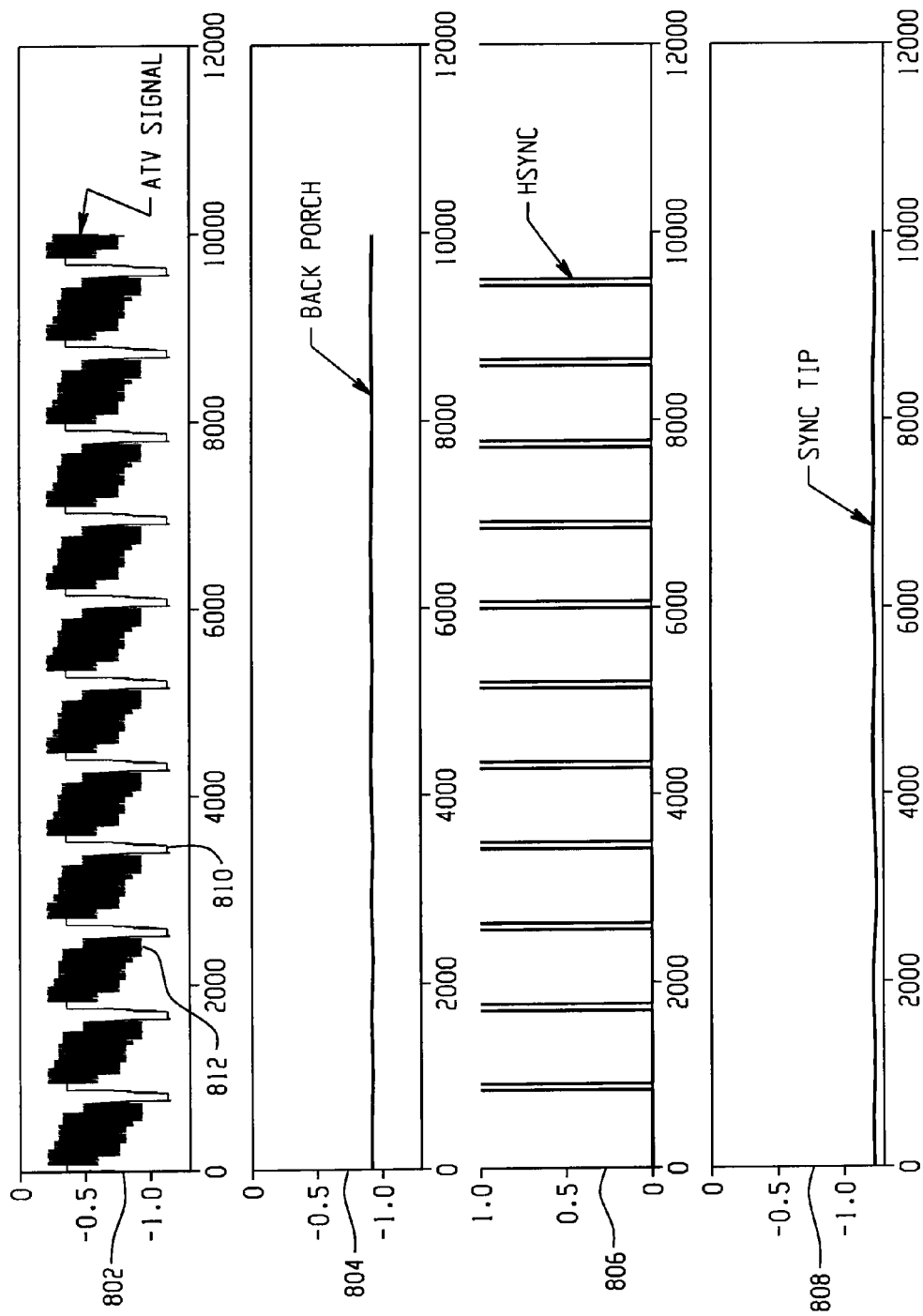
FIG. 8 depicts an example analog television signal received from the automatic gain control amplifier and outputs generated by the synchronization module.

FIG. 7 is a block diagram depicting an example control loop of the intermediate frequency automatic gain controller. The loop is a second-order control loop that first compares a reference level atv_ifagc_vref with a sync tip signal from the synchronization module at 702. FIG. 8 depicts an example analog television signal received at agc_output2sync from the automatic gain control amplifier and example outputs generated by the synchronization module. From the analog television signal 802 received at agc_output2sync, the synchronization module generates a back porch output signal 804, a horizontal synchronization (hsync) output signal 806, and a sync tip output signal 808. The back porch output signal 804 is based on a minimum level of the analog television signal 802, just prior to the synchronization portion 810 of the analog television signal, as indicated at 812. The horizontal synchronization output signal 806 is based on the width of the synchronization portion 810, and the sync tip output signal 808 is based on the level of the synchronization portion 810.

With reference back to FIG. 7, the second-order control loop compares the reference signal atv_ifagc_ref to the sync tip signal from the synchronization module at 702. The resultant error is smoothed by a second-order loop filter. The loop filter has two control parameters, atv_ifagc_kp and atv_ifagc_kf, which control the tracking of fast amplitude variations. The resultant feedback signal ifagcGain is transmitted to the multiplexer and, subsequently, to the tuner when the intermediate frequency automatic gain control is selected by the automatic gain control module.

Figure 9:
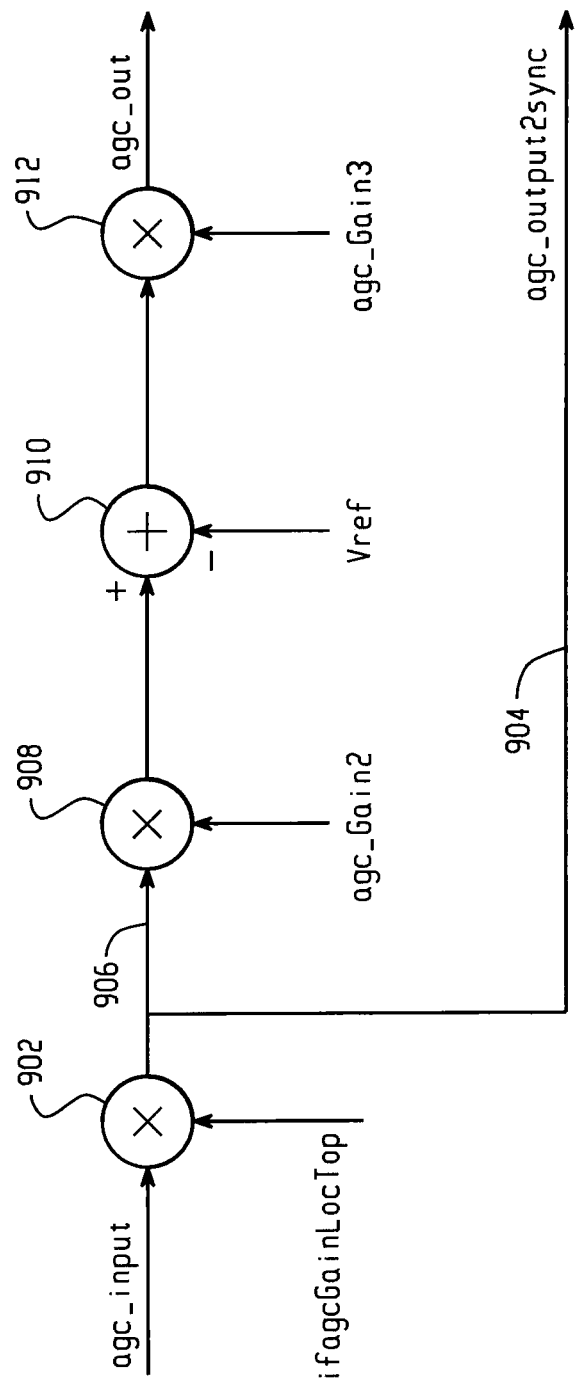
FIG. 9 depicts certain signal adjustments that may be applied to an analog television signal.

In some instances, the feedback from the intermediate frequency automatic gain controller through the tuner gain generator may be subject to some latency that impairs fast amplitude variation tracking. To compensate for this and other interferences, the automatic gain control amplifier may incorporate certain additional adjustments to an analog television signal prior to transmission to the video digital to analog converter. FIG. 9 depicts certain signal adjustments that may be applied to an analog television signal. In the example of FIG. 9, the automatic gain controller amplifier first multiplies the input television signal by a scalar, ifagcGainLocTop at 902. The ifagcGainLocTop value is set by the automatic gain control module, normally to 1. In some cases where strong adjacent channel interference is introduced by nearby channels, the desired in-band television signal level can be dampened as compared with the full analog to digital converter dynamic range. The ifagcGainLocTop scalar is used to compensate for such reduction by multiplying the input signal by a value greater than 1. The multiplied output is transmitted to the synchronization module at 904 and is further processed as described below at 906.

Figure 10:
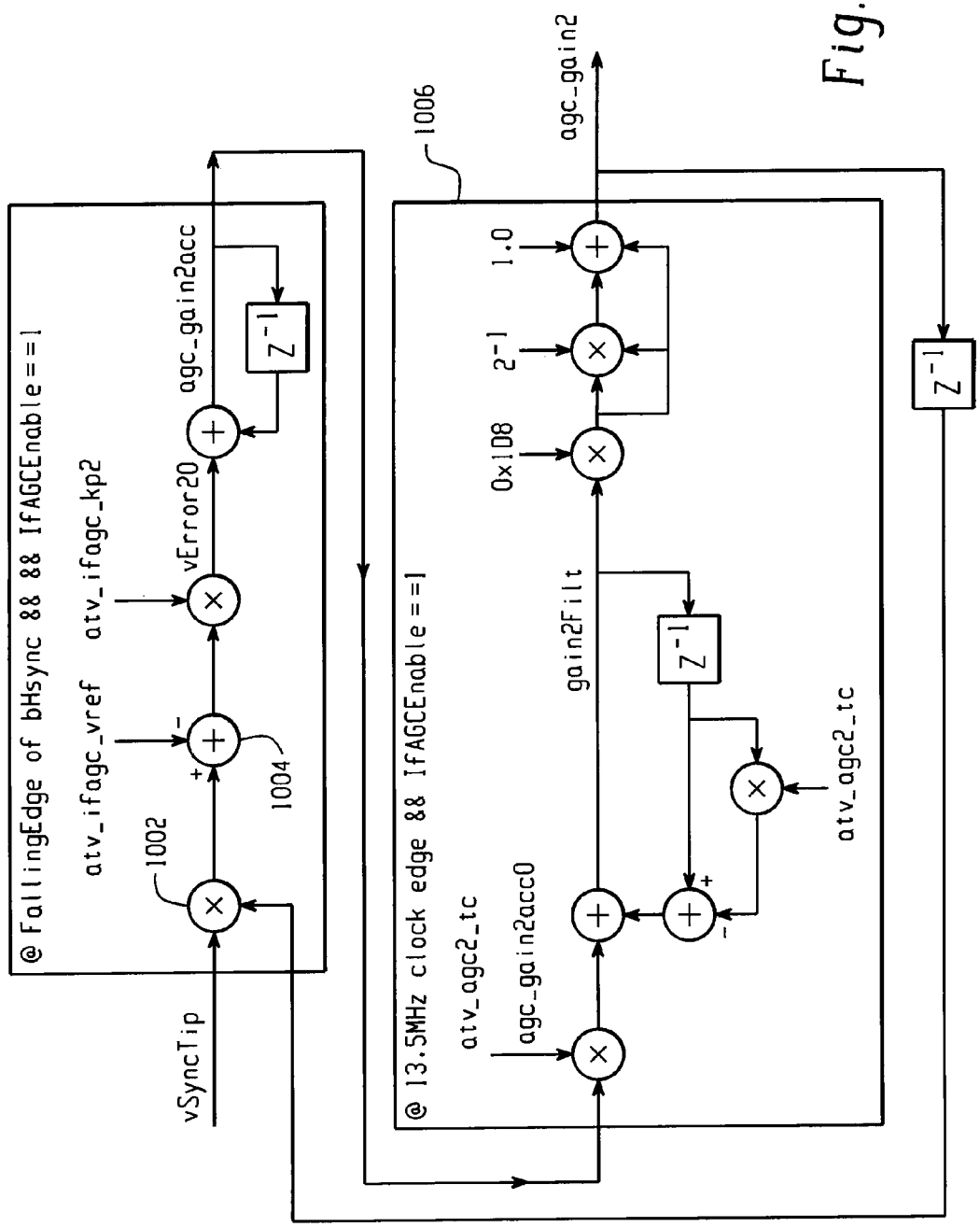
FIG. 10 is a block diagram depicting a first-order loop that transmits an automatic gain control adjustment based on a sync tip signal.

At 908, the multiplied output 906 is adjusted based on a second automatic gain controller adjustment agc_gain2. This second automatic gain controller adjustment can be transmitted by the first-order loop of FIG. 10. FIG. 10 is a block diagram depicting a first-order loop that transmits an automatic gain control adjustment based on a sync tip signal. The sync tip signal is multiplied by the agc_gain2 output signal at 1002 and then compared with a reference level atv_ifagc_vref at 1004. Because the sync tip input appears only once per line period, the output agc_gain2 behaves similarly. Therefore, the output is filtered by an infinite impulse response filter 1006 running at a high clock rate, such as 13.5 MHz. The bandwidth of the infinite impulse response filter 1006 is controlled by atv_agc2_tc. The output of the infinite impulse response filter 1006 gain2filt is converted to decibel units through an exponential operation where:

$$agc\_gain2 = 10^{gain2filt/20}.$$

Because the loop of FIG. 10 only accounts for residual amplitude variation, the gain2filt signal is expected to be small. Thus, the following approximation may be used to implement the exponential operation:

$$agc\_gain2 = 1 + A*gain2filt + (A*gain2filt)^2,$$

where A is a constant equal to log(10)/20. The arrangement of the loop of FIG. 10 does not interfere with the behavior of the first loop depicted in FIG. 7, maintaining a decoupling of the loops.

With reference back to FIG. 9, the result of the second automatic gain control loop adjustment at 908 is further shifted by a constant value Vref at 910, which is set as the reference level of a minimum television signal. The shifted signal may then be multiplied by a third automatic gain control loop gain agc_gain3 at 912.

Figure 11:
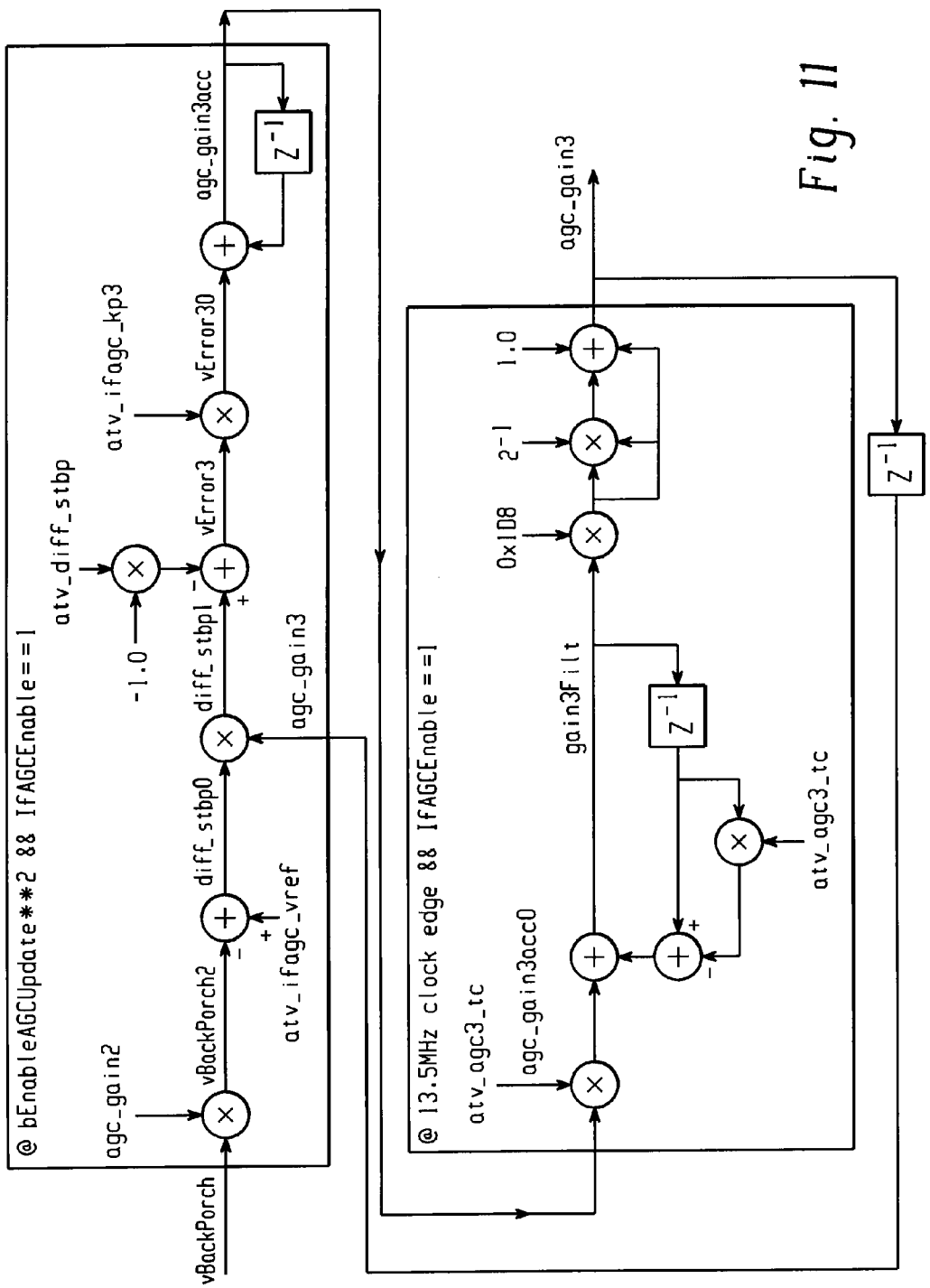
FIG. 11 is a block diagram depicting an example first-order loop for providing the third automatic gain control loop gain.

FIG. 11 is a block diagram depicting an example first-order loop for providing the third automatic gain control loop gain. The behavior of the third automatic gain control loop gain is similar to the functionality of the second automatic gain control loop gain depicted in FIG. 10. Additionally, in the loop of FIG. 11, the back porch measurement by the synchronization module is used to adjust the signal level to that which is expected by the standard output port (e.g., 1 Volt).

Figure 12:
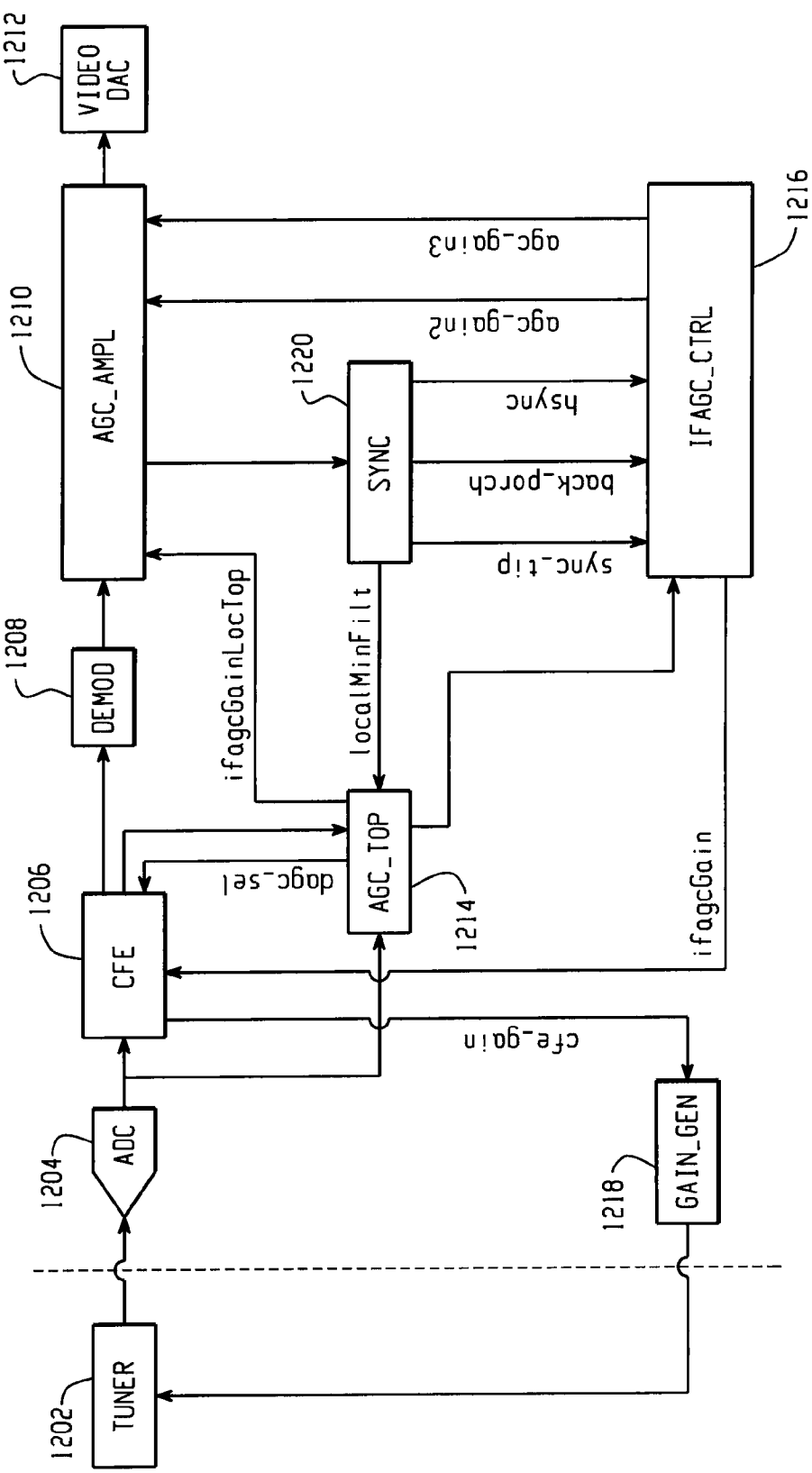
FIG. 12 is a block diagram depicting an alternate configuration for a digital television receiver having common analog television signal and digital television signal processing hardware.

FIG. 12 is a block diagram depicting an alternate configuration for a digital television receiver having common analog television signal and digital television signal processing hardware. A tuner 1202, which may be provided as a separate component from the digital television receiver, selects one channel from a spectrum of channels and transmits an associated analog or digital television signal to an analog to digital converter (ADC) 1204. The analog or digital television signal is processed by the analog to digital converter 1204 to output a digitized television signal. The digitized television signal is transmitted to a common front end 1206 that is configured to perform certain operations on the digitized signal, regardless of whether the digitized signal is associated with an analog or digital television signal 1202. After common front end 1206 processing, the signal is transmitted to a demodulator 1208 that implements signal type specific processing (i.e., analog or digital television signal). The demodulated signals are transmitted to an automatic gain control amplifier 1210, and the amplified signal is transmitted to a video digital to analog converter (DAC) 1212 and display for viewing.

The common front end 1206 can include certain common functions, such as down-conversion, band filtering, and initial automatic gain control. However, it may be desirable to incorporate additional automatic gain control functionality, especially for processing of analog television signals. For example, the output of the common front end 1206 may vary by about 2-3 dB in magnitude for both analog television signals and digital television signals. While this variation has little effect on the video quality for digital television signals, that variation can cause significant video quality issues, such as undesirable flickering, flashings, loss of synchronization, or other uncomfortable visual effects. To address this issue, the common front end provides coarse grained, step control to the tuner 1202, while one of a coarse grained step control or a more fine grained control is applied to the television signal at the common front end.

The digital television receiver of FIG. 12 includes an automatic gain control module 1214 for controlling additional automatic gain control processing. The automatic gain control module 1214 directs the common front end 1206 to apply automatic gain control feedback to the television signal from either the common front end 1206 automatic gain control portion or from an intermediate frequency automatic gain controller (IFAGC) 1216 used for analog television signal operations. When digital television signals are being received, the automatic gain control module 1214 directs that the common front end 1206 automatic gain control be applied to the television signal at the common front end 1206. When analog television signals are being received, the automatic gain control module 1214 selects one of the common front end 1206 automatic gain control signal or the intermediate frequency automatic gain controller's 1216 signal be applied to the television signal at the common front end. The digital television receiver of FIG. 12 also includes a synchronization module 1220 that is responsive to the automatic gain control amplifier 1210 for providing synchronization controls to the automatic gain control module 1214 and the intermediate frequency automatic gain controller 1216.

Figure 13:
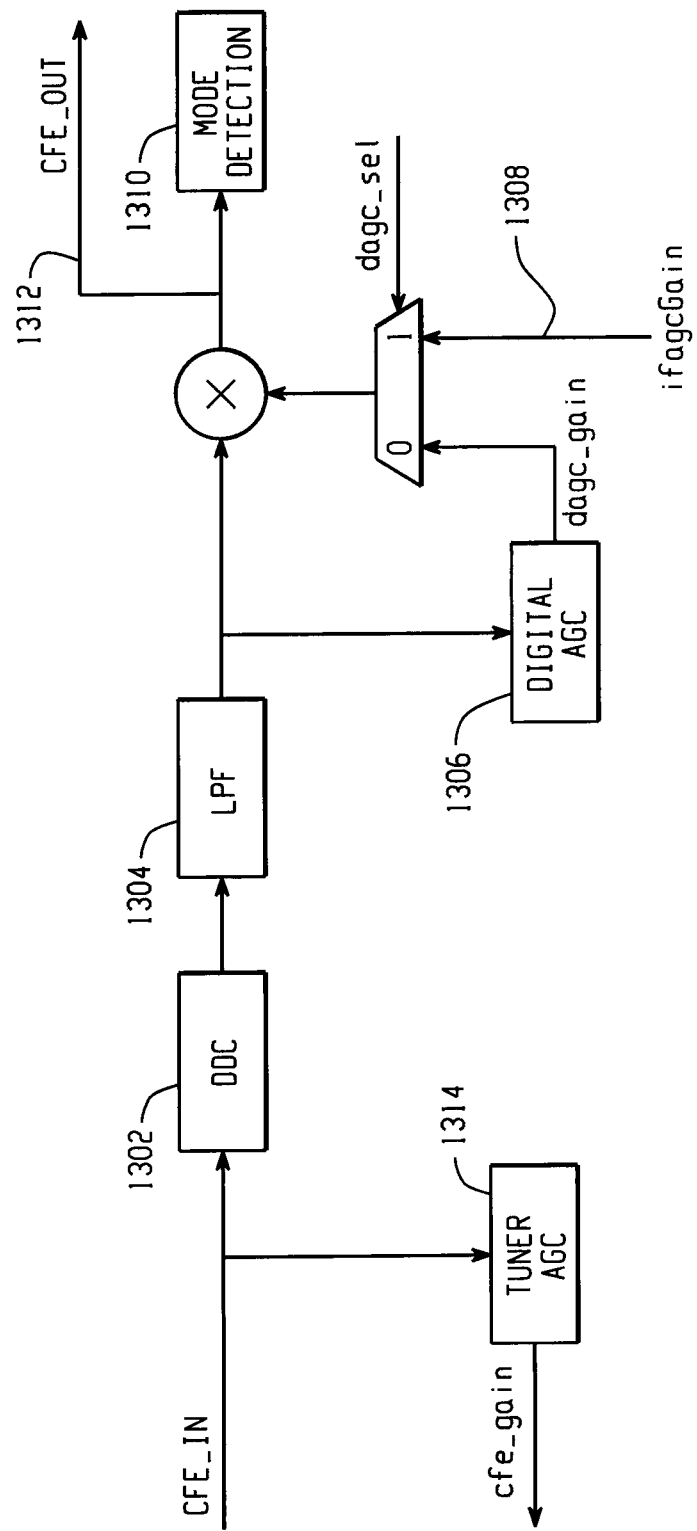
FIG. 13 is a block diagram depicting components of a common front end portion of a digital television receiver.

FIG. 13 is a block diagram depicting components of a common front end portion of a digital television receiver that can be used in the configuration of FIG. 12. The quantized intermediate frequency signal from an analog to digital converter is transmitted, in FIG. 13, to a digital down-converter 1302 and a low pass filter 1304. The output of the low pass filter has one of a common front end digital, step automatic gain control 1306 or fine grained automatic gain control 1308 from the intermediate frequency automatic gain controller applied to the television signal as directed by a selection signal from the automatic gain control module. Following adjustment, mode detection may be performed at 1310, with the adjusted television signal 1312 being transmitted for downstream processing and video viewing. The common front end circuitry of FIG. 13 also provides coarse grained automatic gain control feedback to the tuner at 1314 for adjustment of received television signals.

One or more of the steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

This written description uses examples to disclose the invention, including the best mode, and also to enable a person skilled in the art to make and use the invention. It should be noted that the systems and methods described herein may be equally applicable to other configurations. For example, while the examples depicted herein are described in connection with processing of digital television signals and analog television signals, the disclosed systems and methods may be used to process other types of wireless communication signals—e.g., Wi-Fi communication signals, Bluetooth communication signals, cellular communication signals, etc. In addition, one or more steps of methods described above may be performed in a different order (or concurrently) to achieve desirable results. The patentable scope of the invention may include other examples that occur to those skilled in the art.

It is claimed:

1. A demodulator, comprising:
    an analog to digital converter configured to receive a television signal from a tuner and output a corresponding digitized television signal, wherein the television signal received by the analog to digital converter comprises a digital television signal or an analog television signal;
    a first gain module configured to generate, based on the digitized television signal, a first feedback for adjusting the television signal provided to the analog to digital converter by the tuner, wherein the first feedback is applied to the television signal regardless of whether the television signal is a digital television signal or an analog television signal; and
    a second gain module configured to generate second feedback for further adjusting the television signal provided to the analog to digital converter by the tuner, wherein the second feedback is provided to further adjust the television signal only when the television signal is an analog television signal,
    wherein the first feedback is applied to an analog television signal at initialization, and wherein the second feedback is applied when the analog to digital converter is not saturated more than a threshold number of times during a period of time.

2. The demodulator of claim 1, wherein the first gain module is a component of a common front end module, wherein the common front end module is configured to receive the digitized television signal and to perform one or more common operations on the digitized television signal.

3. The demodulator of claim 1, wherein the second feedback directs the tuner to make smaller magnitude adjustments to the television signal than the first feedback.

4. The demodulator of claim 1, wherein the analog to digital converter has a resolution and a range, wherein the resolution is associated with a number of different digital values that can be represented by the digitized television signal, and wherein the range is associated with a range of values that can be represented by the number of different digital values.

5. The demodulator of claim 4, wherein the first gain module is configured to direct the tuner to adjust the television signal such that the analog to digital converter utilizes a target proportion of the range.

6. The demodulator of claim 1, further comprising a control module that is configured to implement a finite state machine that determines when to switch between the first feedback and the second feedback.

7. The demodulator of claim 6, wherein the control module is configured to select the first feedback at initialization, and wherein the control module is configured to select the second feedback once the digitized television signal is stabilized and meets one or more switching conditions.

8. The demodulator of claim 7, wherein the control module is configured to select the first feedback again when the digitized television signal becomes destabilized.

9. The demodulator of claim 6, further comprising a multiplexer, wherein the control module is configured to transmit a signal to the multiplexer for selecting between the first feedback and the second feedback.

10. The demodulator of claim 2, wherein the analog to digital converter, the common front end module, and the second gain module are fabricated as a single integrated circuit package.

11. The demodulator of claim 1, wherein the second gain module includes a second order feedback loop for generating the second feedback.

12. The demodulator of claim 2, wherein an output of the common front end module is transmitted to a television display.

13. The demodulator of claim 12, wherein the output of the common front end module is adjusted prior to reaching the television display.

14. The demodulator of claim 13, further comprising circuitry configured to sample a sync tip portion of the output of the common front end module and to adjust the output of the common front end module based on the sampled sync tip portion.

15. The demodulator of claim 14, wherein the circuitry further includes a first-order feedback loop configured to determine the adjustments based on the sampled sync tip portion, wherein the output of the common front end module is transmitted to the first-order feedback loop, and wherein the output of the common front end module is adjusted based on the output of the first-order feedback loop.

16. The demodulator of claim 13, further comprising circuitry for configured to sample a back porch portion of the output of the common front end module and to adjust the output of the common front end module based on the sampled back porch portion.

17. The demodulator of claim 16, wherein the circuitry further includes a first-order feedback loop configured to determine the adjustments based on the sampled back porch portion, wherein the output of the common front end module is transmitted to the first-order feedback loop, and wherein the output of the common front end module is adjusted based on the output of the first-order feedback loop.

18. A demodulator, comprising:
an analog to digital converter configured to receive a television signal from a tuner and output a corresponding digitized television signal, wherein the television signal received by the analog to digital converter comprises a digital television signal or an analog television signal;
a first gain module configured to generate, based on the digitized television signal, a first feedback for adjusting the television signal provided to the analog to digital converter by the tuner, wherein the first feedback is applied to the television signal regardless of whether the television signal is a digital television signal or an analog television signal;
a second gain module configured to generate second feedback for further adjusting the television signal provided to the analog to digital converter by the tuner, wherein the second feedback is provided to further adjust the television signal only when the television signal is an analog television signal; and
a control module that is configured to implement a finite state machine that determines when to switch between the first feedback and the second feedback.

19. The demodulator of claim 18, wherein the first feedback is applied to an analog television signal at initialization, and wherein the second feedback is applied when the analog to digital converter is not saturated more than a threshold number of times during a period of time.

20. The demodulator of claim 18, wherein the first gain module is a component of a common front end module, wherein the common front end module is configured to receive the digitized television signal and to perform one or more common operations on the digitized television signal.

21. The demodulator of claim 18, wherein the second feedback directs the tuner smaller magnitude adjustments to the television signal than the first feedback.

22. The demodulator of claim 18, wherein the analog to digital converter has a resolution and a range, wherein the resolution is associated with a number of different digital values that can be represented by the digitized television signal, and wherein the range is associated with a range of values that can be represented by the number of different digital values.

23. The demodulator of claim 22, wherein the first gain module is configured to direct the tuner to adjust the television signal such that the analog to digital converter utilizes a target proportion of the range.

24. The demodulator of claim 18, wherein the control module is configured to select the first feedback at initialization, and wherein the control module is configured to select the second feedback once the digitized television signal is stabilized and meets one or more switching conditions.

25. The demodulator of claim 24, wherein the control module is configured to select the first feedback again when the digitized television signal becomes destabilized.

26. The demodulator of claim 18, further comprising a multiplexer, wherein the control module is configured to transmit a signal to the multiplexer for selecting between the first feedback and the second feedback.

27. The demodulator of claim 20, wherein the analog to digital converter, the common front end module, and the second gain module are fabricated as a single integrated circuit package.

28. The demodulator of claim 18, wherein the second gain module includes a second-order feedback loop for generating the second feedback.

29. The demodulator of claim 20, wherein an output of the common front end module is transmitted to a television display.

30. The demodulator of claim 29, wherein the output of the common front end module is adjusted prior to reaching the television display.

31. The demodulator of claim 30, further comprising circuitry configured to sample a sync tip portion of the output of the common front end module and to adjust the output of the common front end module based on the sampled sync tip portion.

32. The demodulator of claim 31, wherein the circuitry further includes a first-order feedback loop configured to determine the adjustments based on the sampled sync tip portion, wherein the output of the common front end module is transmitted to the first-order feedback loop, and wherein the output of the common front end module is adjusted based on the output of the first-order feedback loop.

33. The demodulator of claim 30, further comprising circuitry configured to sample a hack porch portion of the output of the common front end module and to adjust the output of the common front end module based on the sampled back porch portion.

34. The demodulator of claim 33, wherein the circuitry further includes a first-order feedback loop configured to determine the adjustments based on the sampled back porch portion, wherein the output of the common front end module is transmitted to the first-order feedback loop, and wherein the output of the common front end module is adjusted based on the output of the first-order feedback loop.

35. A demodulator, comprising:
an analog to digital converter configured to receive a television signal from a tuner and output a corresponding digitized television signal, wherein the television signal received by the analog to digital converter comprises a digital television signal or an analog television signal;
a first gain module configured to generate, based on the digitized television signal, a first feedback for adjusting the television signal provided to the analog to digital converter by the tuner, wherein
(a) the first feedback is applied to the television signal regardless of whether the television signal is a digital television signal or an analog television signal,
(b) the first gain module is a component of a common front end module,
(c) the common front end module is configured to receive the digitized television signal and to perform one or more common operations on the digitized television signal, and
(d) an output of the common front end module is transmitted to a television display and is adjusted prior to reaching the television display;
a second gain module configured to generate second feedback for further adjusting the television signal provided to the analog to digital converter by the tuner, wherein the second feedback is provided to further adjust the television signal only when the television signal is an analog television signal; and
circuitry configured to sample a sync tip portion of the output of the common front end module and to adjust the output of the common front end module based on the sampled sync tip portion.

36. The demodulator of claim 35, wherein the circuitry further includes a first-coder feedback loop configured to determine the adjustments based on the sampled sync tip portion, wherein the output of the common front end module is transmitted to the first-order feedback loop, and wherein the output of the common front end module is adjusted based on the output of the first order feedback loop.

37. A demodulator, comprising:
an analog to digital converter configured to receive a television signal from a tuner and output a corresponding digitized television signal, wherein the television signal received by the analog to digital converter comprises a digital television signal or an analog television signal;
a first gain module configured to generate, based on the digitized television signal, a first feedback for adjusting the television signal provided to the analog to digital converter by the tuner, wherein
(a) the first feedback is applied to the television signal regardless of whether the television signal is a digital television signal or an analog television signal,
(b) the first gain module is a component of a common front end module,
(c) the common front end module is configured to receive the digitized television signal and to perform one or more common operations on the digitized television signal, and
(d) an output of the common front end module is transmitted to a television display and is adjusted prior to reaching the television display;
a second gain module configured to generate second feedback for further adjusting the television signal provided to the analog to digital converter by the tuner, wherein the second feedback is provided to further adjust the television signal only when the television signal is an analog television signal; and
circuitry configured to sample a back porch portion of the output of the common front end module and to adjust the output of the common front end module based on the sampled back porch portion.

38. The demodulator of claim 37, wherein the circuitry further includes a first-order feedback loop configured to determine the adjustments based on the sampled back porch portion, wherein the output of the common front end module is transmitted to the first-order feedback loop, and wherein the output of the common front end module is adjusted based on the output of the first-order feedback loop.

* * * * *